May 3, 1927.
L. M. WRAGG
WINDSHIELD
1,626,997
Filed July 20, 1925    2 Sheets-Sheet 1
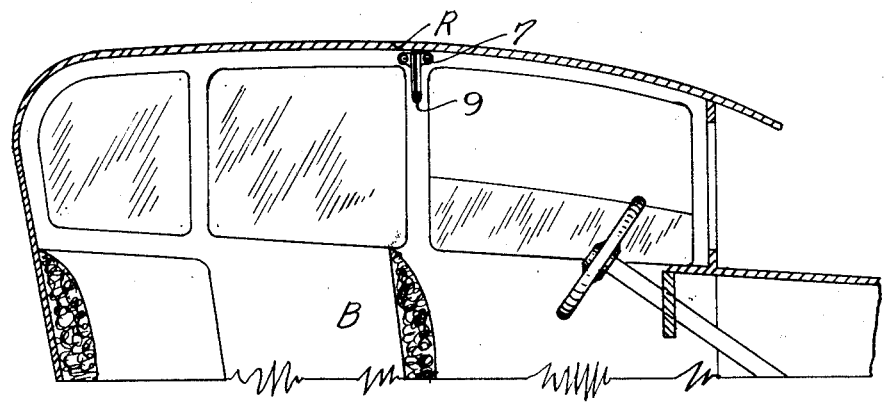
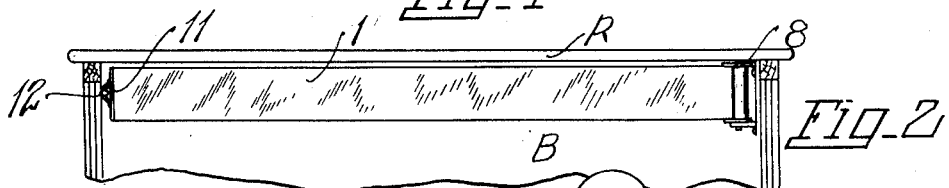
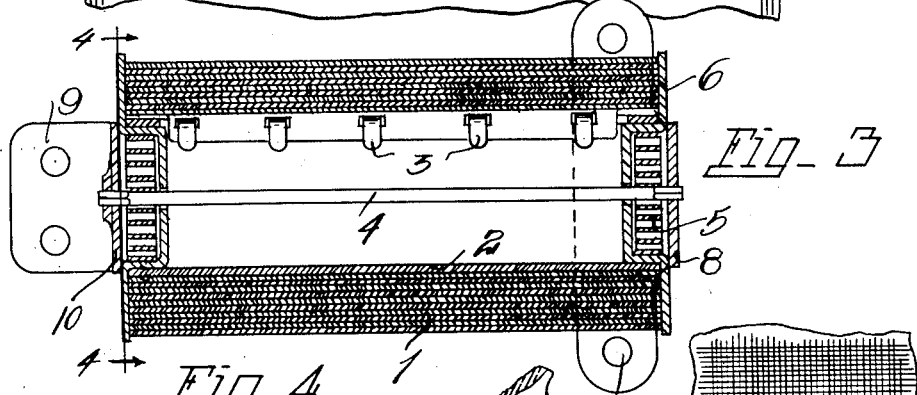
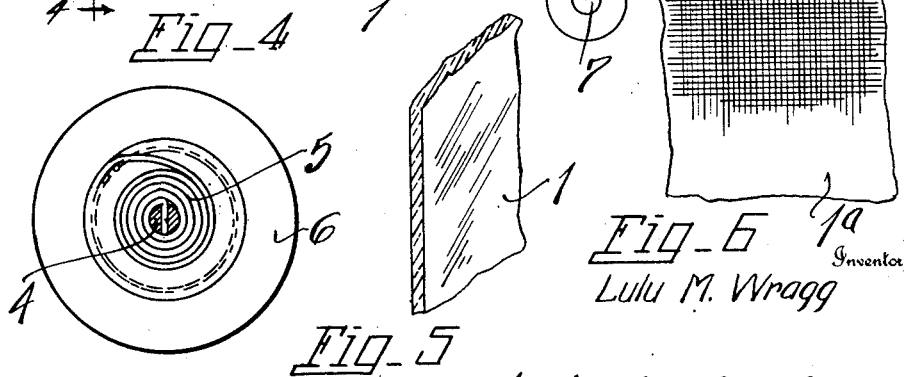
Inventor
Lulu M. Wragg
By Herbert E. Smith
Attorney May 3, 1927.
L. M. WRAGG
1,626,997
WINDSHIELD
Filed July 20, 1925   2 Sheets-Sheet 2
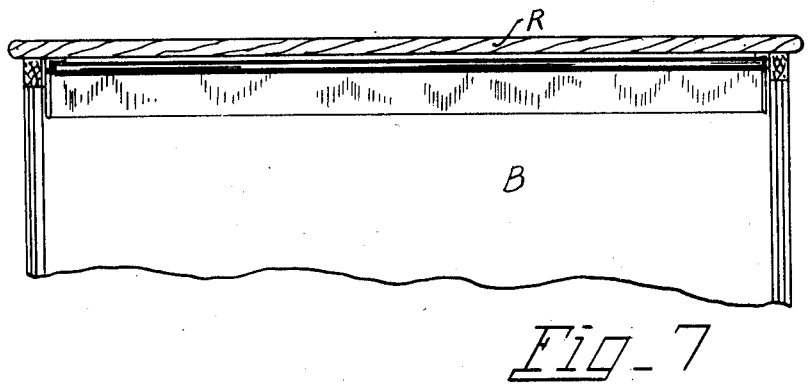
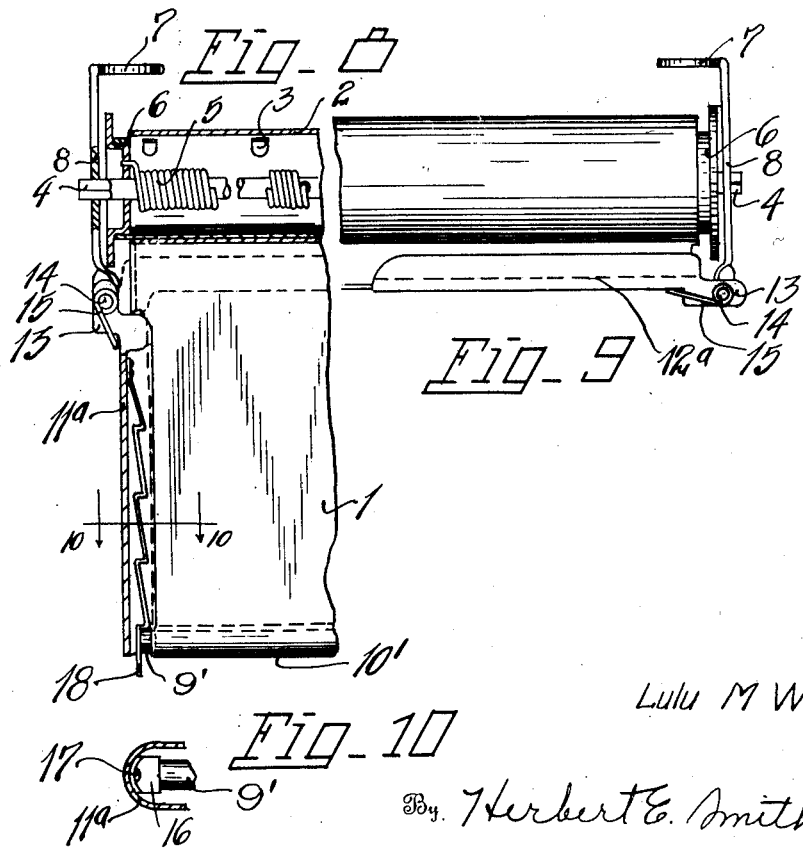
Inventor
Lulu M Wragg
By Herbert E. Smith
Attorney Patented May 3, 1927.

1,626,997

UNITED STATES PATENT OFFICE.

LULU M. WRAGG, OF SPOKANE, WASHINGTON.

WINDSHIELD.

Application filed July 20, 1925. Serial No. 44,696.

My present invention relates to improvements in windshields for use in the interior of closed automobiles and designed to deflect or break up undesirable drafts flowing through the upper portion of the interior of the car to the rear thereof when the closed car is in motion.

The invention contemplates the use of a windshield in the form of a curtain suspended transversely in the interior of the closed car beneath the roof. In carrying out my invention means are provided whereby the curtain or windshield when not in use may be displaced and automatically rolled into compact form, and means are provided whereby the curtain may with facility be unrolled to position transversely of the car and there supported for the performance of its functions.

The invention consists in certain novel combinations and arrangements of parts involving an automatically winding and unwinding roller and curtain and supporting winding means therefor, as will hereinafter be more fully set forth.

In the accompanying drawings a vertically movable curtain and a horizontally movable curtain are illustrated, both of which illustrate physical embodiments of my invention, wherein the parts are combined and arranged according to the principles of my invention.

Figure 1 is a longitudinal vertical sectional view of so much of a closed car body as is necessary to illustrate the application thereto of the windshield of my invention.

Figure 2 is a transverse sectional view of the roof portion of the closed car showing the windshield in use.

Figure 3 is a sectional detail view of the automatic winding mechanism for the curtain.

Figure 4 is a view at line 4—4 of Figure 3 looking in the direction of the arrows.

Figure 5 is a detail perspective view of a fragment of the imperforate curtain and Figure 6 is a similar view of an open or perforated curtain or screen.

Figure 7 is a transverse sectional view at the roof portion of a closed car showing it equipped with a vertically moving curtain or windshield.

Figure 8 is a longitudinal sectional view at one end of the automatic winding roller and showing the means for supporting and retaining the curtain in extended position.

Figure 9 is a view complementary to Figure 8 but with the curtain rolled up, and out of use.

Figure 10 is a detail sectional view at line 10—10 of Figure 8.

In order that the general arrangement and relation of parts may readily be understood I have indicated in the drawings a portion B of the body of a closed automobile with a typical roof portion R, and the curtain or windshield 1, as seen in Figure 1 may be located beneath the roof of the car over the front seat, or in other desirable position.

When made up of the imperforate material 1 in Figure 5 the curtain forms a shield or barrier for deflecting the currents of air flowing through the car near the roof, and preventing these currents from passing downward at the rear of the car to the discomfort of the occupants of the rear seat. When the perforate material indicated at 1ª in Figure 6 is used the curtain performs the function of a perforated screen for breaking up the air currents and preventing their direct flow to the rear of the car.

In Figures 1 through 4 the windshield illustrated is designed to automatically wind upon a vertically disposed roller and be stretched transversely of the car, while in Figures 7 through 10 the windshield is designed to automatically wind upon a horizontally disposed roller, and to be pulled vertically into position transversely of the car.

The roller 2 is preferably of tubular construction and made up of metal and the inner end of the curtain 1 is attached thereto by securing devices 3. The roller shaft 4 extends longitudinally of the roller, and a spring or springs 5 carried in a depression in the heads 6 are used for automatically rewinding the curtain or flexible windshield upon the roller. The shaft 4 which is stationary and upon which the roller revolves, is supported in a bracket as 7 having a perforated supporting plate 8 for the shaft, and the bottom bracket 9 also has a supporting plate 10 for the lower end of the shaft in Figures 1 and 2. These brackets are attached to a stationary and rigid portion of the frame of the body of the car to support the roller in upright position, and the free end of the curtain is provided with an eye or loop 11 which is adapted to be engaged on a hook as 12 fixed at the opposite side of the body B beneath the roof R. Thus it will be apparent that when the curtain is wound upon the roller at one side of the car, the free end of the curtain may be grasped in the hand and the curtain stretched across the upper portion of the car and fastened by means of the eye 11 and hook 12. In this position the curtain depends from the roof of the car a suitable distance to perform its required functions.

In Figures 7 through 10 the curtain 1 is suspended on the automatically winding roller 2 and secured thereto by means of the fastening cleats 3. The shaft 4 is disposed in horizontal position for the roller to revolve thereon and the coiled spring 5 on the shaft is fastened at one end to said shaft and at its other end to one of the roller heads 6 in order that the roller may automatically wind the curtain 1 thereon.

The brackets 7 located at opposite ends of the roller are attached to the frame at the respective sides of the interior of the car body and perforated plates 8 of these brackets afford a support for the opposite ends of the shaft 4.

At its free end the curtain is provided with a retaining rod 9' carried in a casing 10' of the curtain, and the ends of this retaining rod project from the casing as best shown in Figure 8.

The curtain or windshield is supported in extended position through the instrumentality of a pair of hangers 11ª and 12ª preferably made up of metal plates, semi-circular in cross section as indicated in Figure 10 and adapted at their edges to overlap the edges of the curtain when the latter is extended.

At their upper portions these hangers are fashioned with offset ends 13 that are pivoted at 14 to the lower ends of the plates 8 of the brackets 7. The hangers are thus permitted to swing inwardly from vertical to horizontal position, or to swing outwardly from horizontal to vertical position as indicated in Figs. 8 and 9. By means of springs 15 the hangers are urged to swing inwardly, and when the curtain is wound upon its roller the springs hold the free end of the curtain by retaining the hangers in the position indicated in Figure 9 with the hangers disposed horizontally and overlapping the free edge of the curtain.

When the curtain is extended the rod 9' holds the hangers distended and the springs hold the hangers in position to retain the curtain in extended position. For this purpose each hanger is provided with a resilient rack plate 16 fixed at its upper end 17 within the grooved hanger and spaced a sufficient distance therefrom to permit a slight release movement. As best seen in Figure 8 the automatically winding curtain may be retained in adjusted position by engaging the ends of the rod 9' with a pair of selected notches of the rack plates and by this means the curtain is held in extended position. When it is desired to release the rod for winding the curtain, pressure may be applied to a flange or lug 18 at the lower end of each rack plate to swing said plates free of the rod ends, whereupon the roller may automatically wind the curtain thereon. Then the hangers are folded inwardly on their pivots to the position of Figure 9.

The hangers retain the curtain in position against the force of the air currents directed against it as the car moves forward and the grooved formation of the hangers, overlapping the side edges of the curtain prevent flapping thereof.

The rear of the windshield may be varied to suit different conditions by adjusting the rod to selected pairs of notches of the rack plates which will then retain the curtain in the adjusted position, and it will be apparent that the length of the hangers may be increased if desired to accommodate the desired length of the curtain.

Having thus fully described my invention what I claim and desire to secure by Letters Patent is—

The combination with a curtain, an automatically actuated winding roller therefor, and pivoted foldable supporting hangers adapted to be extended parallel with and support the side edges of said curtain against wind pressure, of resilient rack-plates carried by said hangers, and a retaining rod carried by said curtain for co-action with said plates.

In testimony whereof I affix my signature.

LULU M. WRAGG.